J. A. BRYANT.
NUT LOCK.
APPLICATION FILED OCT. 26, 1912.
1,076,098.
Patented Oct. 21, 1913.
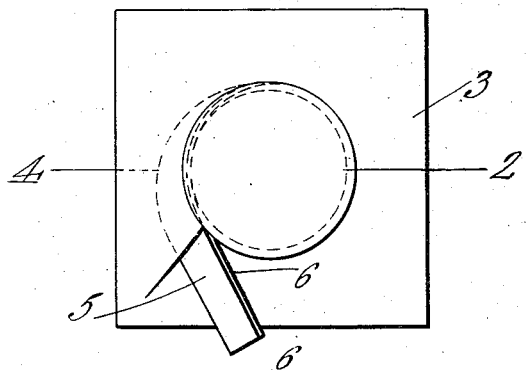
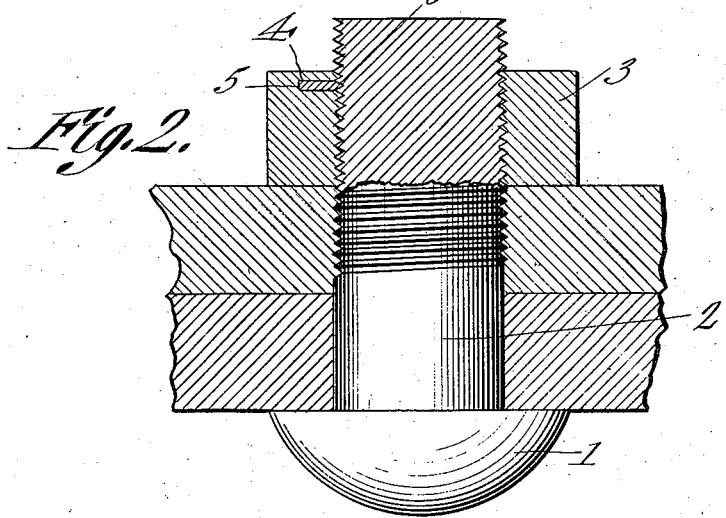
Witnesses
Joshua A. Bryant
Inventor
by C. A. Snow & Co.
Attorneys

UNITED STATES PATENT OFFICE.

JOSHUA A. BRYANT, OF PRINCETON, CALIFORNIA, ASSIGNOR OF TWO-THIRDS TO HENRY QUINT, OF PRINCETON, CALIFORNIA.

NUT-LOCK.

1,076,098.  Specification of Letters Patent.  Patented Oct. 21, 1913.

Application filed October 26, 1912. Serial No. 727,989.

*To all whom it may concern:*

Be it known that I, JOSHUA A. BRYANT, a citizen of the United States, residing at Princeton, in the county of Colusa and State of California, have invented a new and useful Nut-Lock, of which the following is a specification.

This invention relates to nut locks and has for its object the provision of simple, inexpensive and practical means for locking a nut on its bolt, thereby preventing the displacement of the nut, and furthermore allowing the locking of the nut on any point determined upon.

In the drawings, forming part of this specification, and in which like characters of reference indicate corresponding parts, Figure 1 is a top plan view of the improved nut lock; Fig. 2 is a vertical section of the nut lock and two timbers fastened together thereby; Fig. 3 is a detail view of the hook-shaped key.

Referring to the drawings, by the reference characters marked thereon, 1 designates the head of a bolt the body portion of which as illustrated in Fig. 2 of the drawings extends through two pieces of timber which are held together thereby. The body portion 2 is formed integral with the head 1 at one end thereof and the end remote therefrom is threaded and adapted to threadedly engage the nut 3. The nut 3 is arranged so that it can be screwed upon the bolt 2 without difficulty and it is provided near its outer extremity with a cut-away portion 4 which conforms to one of the threads which is formed therein. The cut-away portion corresponds substantially in form to the member 5, which may be conveniently described as a metallic hook shaped key, the edge of the hook shaped key being cut-away so as to conform to the circumference of the bolt 2 with which it is to be used. The nut 3 is of the usual construction, except as regards the cut-away portion 4 which is preferably formed near the outer surface of the nut, as shown. This cut-away portion corresponds in form to the locking member 5 which is provided to engage therewith, as shown in Figs. 1 and 2 and fills the curvature of one of the threads formed on the nut 3. When the member 5 is seated in the opening 4 provided therefor, as shown in the drawings, it can be forced on into the bolt which passes through the end, thus fastening the nut and the member 5 in position.

In order that the member 5 may conform ordinarily to the form of the bolt, the locking of which is desired, the inner edge of the member is preferably provided with a double bevel 6 as clearly shown in Figs. 2 and 3 of the drawings. This double bevel conforms to the surface of the screw, as will be readily seen.

The application of the device will be readily understood from the foregoing description. The bolt being seated in proper position, the nut with the fastening member 4 fitted thereinto is screwed onto the bolt until the nut is suitably tightened. Then a pressure on the ends of the member 5 will result in the forcing of it around into the position shown in the drawings. As soon as the member 5 occupies the position referred to, it will be impossible to loosen the nut, but if it is desired to loosen the nut, a blow on the far side of the member 4 will result in its being loosened enough to permit the unfastening of the bolt and the disengagement of the nut therefrom.

What I claim as new and desire to secure by Letters Patent is:

1. A nut lock comprising a bolt, a nut having an aperture extending into the outer face thereof and communicating with the threaded portion of said nut, a hook shaped key extending within said aperture and adapted to wedgedly engage the said bolt, the rear portion of said key extending beyond said nut aperture whereby the same may be driven into engagement with or disengaged from the said bolt.

2. The combination of a bolt, a nut adapted to threadedly engage the same, said nut provided with an arcuate aperture communicating with the threaded portion of said nut, a hook shaped key conforming with the outline of said nut aperture and adapted to extend therein and to wedgedly engage the side walls thereof and to wedgedly engage the said bolt to securely lock the nut against movement with relation to said bolt.

In testimony that I claim the foregoing as my own, I have hereto affixed my signature in the presence of two witnesses.

JOSHUA A. BRYANT.

Witnesses:
F. W. MEHLER,
D. H. THOMPSON.